United States Patent
He

(10) Patent No.: US 11,838,062 B2
(45) Date of Patent: Dec. 5, 2023

(54) HEADSET DATA TRANSMISSION METHOD, SYSTEM, AND DEVICE AND COMPUTER STORAGE MEDIUM

(71) Applicant: GOERTEK INC., Shandong (CN)

(72) Inventor: Chong He, Shandong (CN)

(73) Assignee: GOERTEK INC., Shandong (CN)

( * ) Notice: Subject to any disclaimer, the term of this patent is extended or adjusted under 35 U.S.C. 154(b) by 204 days.

(21) Appl. No.: 17/594,041

(22) PCT Filed: Dec. 28, 2019

(86) PCT No.: PCT/CN2019/129584
§ 371 (c)(1),
(2) Date: Sep. 30, 2021

(87) PCT Pub. No.: WO2021/072980
PCT Pub. Date: Apr. 22, 2021

(65) Prior Publication Data
US 2022/0166524 A1    May 26, 2022

(30) Foreign Application Priority Data
Oct. 18, 2019   (CN) .......................... 201910996176.X

(51) Int. Cl.
*H04R 3/04* (2006.01)
*H04R 1/10* (2006.01)
*H04B 11/00* (2006.01)

(52) U.S. Cl.
CPC ............... *H04B 11/00* (2013.01); *H04R 1/10* (2013.01); *H04R 3/04* (2013.01)

(58) Field of Classification Search
None
See application file for complete search history.

(56) References Cited

U.S. PATENT DOCUMENTS 5,566,101 A * 10/1996 Kodra .................... H03H 17/06
708/319
2005/0047712 A1   3/2005 Osellame et al.
(Continued)

FOREIGN PATENT DOCUMENTS

| CN | 101360087 A | 2/2009 |
| CN | 101826855 A | 9/2010 |

(Continued)

OTHER PUBLICATIONS

International Search Report, English translation, from PCT/CN2019/129584 filed Dec. 28, 2019, dated Jul. 21, 2020.

*Primary Examiner* — James K Mooney
(74) *Attorney, Agent, or Firm* — HAUPTMAN HAM, LLP

(57) ABSTRACT

A method, a system, and a device for transmitting data through an earphone and a computer storage medium are provided. A first data type of to-be-transmitted data is acquired, a second data type set for an FIR filter coefficient is acquired, and a sum of the number of decimal places indicated by the first data type and the number of decimal places indicated by the second data type is determined. A data type which indicates a number of decimal places that is at least two orders more than the sum is determined among preset data types as a third data type of an FIR filtering result, and FIR filtering is performed on the to-be-transmitted data to obtain a target filtering result and transmit the target filtering result.

10 Claims, 6 Drawing Sheets

(56) References Cited

U.S. PATENT DOCUMENTS

| | | |
|---|---|---|
| 2010/0191528 A1 | 7/2010 | Okuda et al. |
| 2011/0279162 A1 | 11/2011 | Deng et al. |
| 2015/0003649 A1 | 1/2015 | Horbach |
| 2018/0048958 A1 | 2/2018 | Liang et al. |

FOREIGN PATENT DOCUMENTS

| | | |
|---|---|---|
| CN | 104254049 A | 12/2014 |
| CN | 105992100 A | 10/2016 |
| CN | 107276620 A | 10/2017 |
| JP | H0730373 A | 1/1995 |
| WO | 2018161277 A1 | 9/2018 |

* cited by examiner

HEADSET DATA TRANSMISSION METHOD, SYSTEM, AND DEVICE AND COMPUTER STORAGE MEDIUM

This application is the national phase of International Patent Application No. PCT/CN2019/129584, titled "HEADSET DATA TRANSMISSION METHOD, SYSTEM, AND DEVICE AND COMPUTER STORAGE MEDIUM", filed on Dec. 28, 2019, which claims priority to Chinese Patent Application No. 201910996176.X, titled "HEADSET DATA TRANSMISSION METHOD, SYSTEM, AND DEVICE AND COMPUTER STORAGE MEDIUM", filed on Oct. 18, 2019 with the China National Intellectual Property Administration (CNIPA), both of which are incorporated herein by reference in their entireties.

FIELD

The present disclosure relates to the field of communication technologies, and in particular to a method, a system, and a device for transmitting data through an earphone, and a computer storage medium.

BACKGROUND

With the development of communication technologies, when using electronic devices such as mobile phones and tablets, users may use earphones to transmit data so as to receive the data comfortably. An earphone (also known as a headphone, a head-set, and earpieces) includes a pair of conversion units to receive electrical signals from a media player or a receiver and convert the received electrical signals into audible sound waves by using speakers close to ears.

Nowadays, increase in the types of earphones provides users with more choices. For example, a user may choose a wired earphone, a True Wireless Stereo (TWS) earphone, or the like.

However, when transmitting data through an earphone, sound cracking, distortion or other problem may occur, resulting in poor user experience.

Therefore, a problem to be solved urgently by those skilled in the art is how to improve performance of an earphone for data transmission.

SUMMARY

A method for transmitting data through an earphone is provided in the present disclosure, to solve the technical problem of how to improve performance of an earphone for data transmission to a certain extent. A system for transmitting data through an earphone, a device for transmitting data through an earphone, and a computer readable storage medium are further provided in the present disclosure.

The following technical solutions are provided in the present disclosure.

The method for transmitting data through an earphone is applied to an earphone, and includes steps of: acquiring a first data type of to-be-transmitted data; acquiring a second data type set for an FIR filter coefficient; determining a sum of the number of decimal places indicated by the first data type and the number of decimal places indicated by the second data type; determining, among preset data types, a data type indicating the number of decimal places that is at least two orders more than the sum as a third data type of an FIR filtering result; and performing FIR filtering on the to-be-transmitted data to obtain a target filtering result, and transmitting the target filtering result.

In a preferred embodiment, after the step of determining a sum of a number of decimal places indicated by the first data type and a number of decimal places indicated by the second data type, and before the step of determining, among preset data types, a data type indicating the number of decimal places that is at least two orders more than the sum as a third data type of an FIR filtering result, the method further includes: acquiring a fourth data type set for the FIR filtering result; and determining, among the preset data types, whether the number of decimal places indicated by the fourth data type is at least two orders more than the sum. In a case that the number of decimal places indicated by the fourth data type is at least two orders more than the sum, the step of determining, among preset data types, a data type indicating a number of decimal places that is at least two orders more than the sum as a third data type of an FIR filtering result is performed.

In a preferred embodiment, before the step of determining a sum of the number of decimal places indicated by the first data type and the number of decimal places indicated by the second data type, the method further includes; determining whether a chip of the earphone is a fixed-point chip. In a case that the chip of the earphone is a fixed-point chip, the step of determining a sum of the number of decimal places indicated by the first data type and a number of decimal places indicated by the second data type is performed.

In a preferred embodiment, the step of performing FIR filtering on the to-be-transmitted data includes: performing FIR filtering on the to-be-transmitted data in a parallel manner.

The system for transmitting data through an earphone is applied to the earphone, and includes: a first acquiring module configured to acquire a first data type of to-be-transmitted data; a second acquiring module configured to acquire a second data type of a set coefficient for an FIR filter; a first determining module configured to determine a sum of the number of decimal places indicated by the first data type and the number of decimal places indicated by the second data type; a second determining module configured to determine, among preset data types, a data type indicating the number of decimal places that is at least two orders more than the sum as a third data type of an FIR filtering result; and a first filtering module configured to perform FIR filtering on the to-be-transmitted data to obtain a target filtering result, and transmit the target filtering result.

In a preferred embodiment, the system further includes a third acquiring module and a first detecting module. The third acquiring module is configured to acquire a fourth data type set for the FIR filtering result, after the first determining module determines a sum of the number of decimal places indicated by the first data type and the number of decimal places indicated by the second data type, and before the second determining module determines, among preset data types, a data type indicating the number of decimal places that is at least two orders more than the sum as a third data type of an FIR filtering result. The first detecting module is configured to: determine, among the preset data types, whether the number of decimal places indicated by the fourth data type is at least two orders more than the sum; and instruct, in a case that the number of decimal places indicated by the fourth data type is at least two orders more than the sum, the second determining model to perform a step of determining, among preset data types, a data type indicating the number of decimal places that is at least two orders more than the sum as a third data type of an FIR filtering result.

In a preferred embodiment, the system further includes a second detecting module, configured to: determine whether a chip of the earphone is a fixed-point chip, before the first determining module determines a sum of the number of decimal places indicated by the first data type and the number of decimal places indicated by the second data type; and instruct, in a case that the chip of the earphone is a fixed-point chip, the first determining module to perform a step of determining a sum of the number of decimal places indicated by the first data type and the number of decimal places indicated by the second data type.

In a preferred embodiment, the first filtering module includes a first filtering unit configured to perform FIR filtering on the to-be-transmitted data in a parallel manner.

The device for transmitting data through an earphone is applied to an earphone, and includes: a memory, configured to store a computer program; and a processor configured to execute the computer program to perform steps of the method for transmitting data through an earphone as described in any one of the embodiments.

The computer readable storage medium stores a computer program, the computer program, when being executed by a processor, performing steps of the method for transmitting data through an earphone as described in any one of the embodiments.

With the method for transmitting data through an earphone according to the present disclosure which is applied to an earphone, a first data type of to-be-transmitted data is acquired; a second data type set for an FIR filter coefficient is acquired; a sum of the number of decimal places indicated by the first data type and the number of decimal places indicated by the second data type is determined; a data type which indicates a number of decimal places that is at least two orders more than the sum is determined among preset data types as a third data type of an FIR filtering result; and FIR filtering is performed on the to-be-transmitted data to obtain a target filtering result and transmit the target filtering result. With the method for transmitting data through an earphone according to the present disclosure, the data type indicating the number of decimal places that is at least two orders more than the sum is determined among the preset data types as the third data type of an FIR filtering result, and the FIR filtering is performed on the to-be-transmitted data based on the third data type. In this way, noise in the to-be-transmitted data is reduced, and there is no sound cracking, distortion or other problems caused by overflow of the filtering result in the filtering process. Therefore, a sound effect of the FIR filtering result can be improved and the performance of the earphone for data transmission is improved. The system for transmitting data through an earphone, the device for transmitting data through an earphone, and the computer readable storage medium can also solve the above technical problem.

BRIEF DESCRIPTION OF THE DRAWINGS

For clearly illustrate the technical solutions in embodiments of the present disclosure or in conventional technologies, drawings to be used in description of the embodiments or conventional technologies are briefly described below. Apparently, the drawings in the following descriptions show only some embodiments of the present disclosure, and a person of ordinary skill in the art may derive other drawings from the drawings without any creative effort.

DETAILED DESCRIPTION

Technical solutions in the embodiments of the present disclosure are clearly and completely described below in conjunction with the drawings of the embodiments of the present disclosure. Apparently, the embodiments described in the following are only some embodiments of the present disclosure, rather than all of the embodiments. Any other embodiments obtained by those skilled in the art based on the embodiments in the present disclosure without any creative effort shall fall within the protection scope of the present disclosure.

With the development of communication technologies, when using electronic devices such as mobile phones and tablets, users may use earphones to transmit data so as to receive the data comfortably. An earphone (also known as a headphone, a head-set, and earpieces) includes a pair of conversion units to receive electrical signals from a media player or a receiver and convert the received electrical signals into audible sound waves using speakers close to ears. Nowadays, increase in the types of earphones provides users with more choices. For example, a user may choose a wired earphone, a True Wireless Stereo (TWS) earphone, or the like. However, when transmitting data through an earphone, sound cracking, distortion or other problem may occur, resulting in poor user experience. A method for transmitting data through an earphone is provided according to the present disclosure, to improve performance of the earphone for data transmission.

Figure 1:
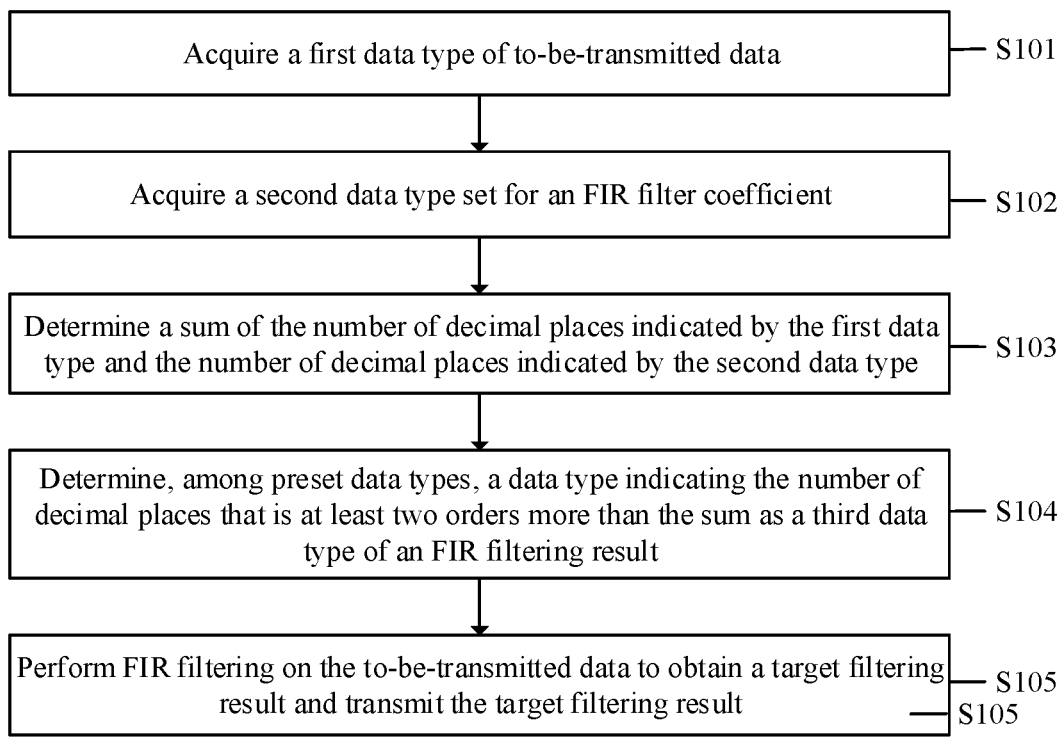
FIG. 1 is a flow chart of a method for transmitting data through an earphone according to an embodiment of the present disclosure.

Reference is made to FIG. 1, which is a flow chart of a method for transmitting data through an earphone according to an embodiment of the present disclosure.

The method for transmitting data through an earphone according to the embodiment of the present disclosure is applied to an earphone, and includes the following steps S101 to S105.

In step S101, a first data type of to-be-transmitted data is acquired.

In step S102, a second data type of a set FIR filter coefficient is acquired.

In practice, since the first data type of the to-be-transmitted data and the second data type of the FIR filter coefficient may affect a data type of an FIR filtering result, it is required to acquire the first data type of the to-be-transmitted data and the second data type of the FIR filter coefficient.

In step S103, a sum of the number of decimal places indicated by the first data type and the number of decimal places indicated by the second data type is determined.

In step S104, a data type indicating the number of decimal places that is at least two orders more than the sum is determined, among preset data types, as a third data type of an FIR filtering result.

In practice, the preset data types each has the determined number of decimal places, and may be sorted by their numbers of decimal places. For example, for data types Q15, Q31 and Q63, the number of decimal places indicated by Q63 is two orders more than that indicated by Q15, and the number of decimal places indicated by Q31 is one order more than that indicated by Q15. In order to avoid overflow of the FIR filtering result, a data type indicating the number of decimal places that is at least two orders more than the sum is determined, among preset data types, as a third data type of an FIR filtering result.

In a conventional technology, a data type indicating the number of decimal places that is one order more than the number of decimal places indicated by the first data type of the to-be-transmitted data is generally determined as the data type of the FIR filtering result. Taking the data types Q15, Q31 and Q63 as an example, if the to-be-transmitted data is of the data type Q15, Q63 is determined as the data type of the FIR filtering result. However, the FIR filtering result may overflow beyond the Q63 due to data accumulation during the FIR filtering process. Without appropriate processing, sound cracking and distortion may occur in the filtering result, which effects data transmission through the earphone. In view of the above, an FIR filtering process for the data to be transmitted through the earphone is analyzed.

It is assumed that a filter coefficient of the earphone is represented as b(n)(−1≤b(n)≤0.9999695), an input signal is represented as x(n), an output is represented as y(n), where $$\sum_{n=0}^{numTaps-1} |b(n)| \leq 1,$$

and a length of the filter coefficient is represented as numTaps.

According to the FIR filter principle, there is no feedback, and FIR filtering may be implemented as follows:

$$y(n)=b(0)*x(n)+b(1)*x(n-1)+b(2)*x(n-2)+ \ldots +(numTaps-1)*x(n-numTaps+1)$$

If the data types of both the to-be-transmitted data and the FIR filter coefficient are Q15, then $$|Y(n)| = \left| \begin{array}{l} 2^{30}*b(0)*x(n) + 2^{30}*b(1)*x(n-1) + 2^{30}*b(2)*x(n-2) + \\ \ldots + 2^{30}*b(numTaps-1)*x(n-numTaps+1) \end{array} \right| \leq$$

$$2^{30} \left( \begin{array}{l} |b(0)*x(n)| + |b(1)*x(n-1)| + |b(2)*x(n-2)| + \\ \ldots + b(numTaps-1)*x(n-numTaps+1) \end{array} \right) \leq$$

$$2^{30}(|b(0)| + |b(1)| + |b(2)| + \ldots + |b(n-numTaps+1)|) \leq 2^{30}$$

In a case of $$\sum_{n=0}^{numTaps-1} |b(n)| \leq 1,$$

the FIR filtering result is determined to be the data type Q31, to prevent the earphone from data overflowing. However, in practice, it is not always true for $$\sum_{n=0}^{numTaps-1} |b(n)| \leq 1.$$

Therefore, in order to prevent the earphone from data overflowing, it is required to determine, among preset data types, a data type indicating the number of decimal places that is at least two orders more than the sum as the third data type of the FIR filtering result. That is, Q63 is determined as the data type of the FIR filtering result. In this way, there is:

$$|Y(n)| = \left| \begin{array}{l} 2^{30}*b(0)*x(n) + 2^{30}*b(1)*x(n-1) + 2^{30}*b(2)*x(n-2) + \\ \ldots + 2^{30}*b(numTaps-1)*x(n-numTaps+1) \end{array} \right| \leq$$

$$2^{30} \left( \begin{array}{l} |b(0)*x(n)| + |b(1)*x(n-1)| + |b(2)*x(n-2)| + \\ \ldots + b(numTaps-1)*x(n-numTaps+1) \end{array} \right) \leq$$

$$2^{30}(|b(0)| + |b(1)| + |b(2)| + \ldots + |b(n-numTaps+1)|) \leq 2^{63}$$

Therefore, the data type indicating the number of decimal places that is at least two orders more than the sum is determined among the preset data types as the third data type of an FIR filtering result, such that overflow of the FIR filtering result in the earphone can be avoided.

In step 105, FIR filtering is performed on the to-be-transmitted data to obtain a target filtering result, and the target filtering result is transmitted.

With the method for transmitting data through an earphone according to the present disclosure, which is applied to an earphone, a first data type of to-be-transmitted data is acquired; a second data type set for an FIR filter coefficient is acquired; a sum of the number of decimal places indicated by the first data type and the number of decimal places indicated by the second data type is determined; a data type indicating the number of decimal places that is at least two orders more than the sum is determined among preset data types as a third data type of an FIR filtering result; and FIR filtering is performed on the to-be-transmitted data to obtain a target filtering result and transmitting the target filtering result. In the method for transmitting data through an earphone according to the present disclosure, the data type among the preset data types that indicates a number of decimal places at least two orders more than the sum is determined as the third data type of an FIR filtering result, and the FIR filter is applied to the to-be-transmitted data to obtain the FIR filtering result in the third data type. With the method for transmitting data through an earphone according to the present disclosure, the data type indicating the number of decimal places that is at least two orders more than the sum is determined among the preset data types as the third data type of an FIR filtering result, and the FIR filtering is performed on the to-be-transmitted data based on the third data type. In this way, noise in the to-be-transmitted data is reduced, and there is no sound cracking, distortion or other problems caused by overflow of the filtering result in the filtering process. Therefore, a sound effect of the FIR filtering result can be improved and the performance of the earphone for data transmission is improved.

With the method for transmitting data through an earphone according to the present disclosure which is applied to an earphone, in a case that the number of decimal places indicated by the data type set for the FIR filtering result is at least two orders more than the sum of the number of decimal places indicated by the first data type and the number of decimal places indicated by the second data type, the data type set for the FIR filtering result may not be adjusted. Therefore, after the step of determining a sum of the number of decimal places indicated by the first data type and the number of decimal places indicated by the second data type, and before the step of determining, among preset data types, a data type indicating the number of decimal places that is at least two orders more than the sum as a third data type of an FIR filtering result, the method may further include: acquiring a fourth data type set for the FIR filtering result; determining, among the preset data types, whether the number of decimal places indicated by the fourth data type is at least two orders more than the sum. In a case that the number of decimal places indicated by the fourth data type is at least two orders more than the sum, the step of determining, among preset data types, a data type indicating a number of decimal places that is at least two orders more than the sum as a third data type of an FIR filtering result is performed.

With the method for transmitting data through an earphone according to the present disclosure which is applied to an earphone, in a case that a chip of the earphone is a float-point chip, it is unnecessary to concern about any overflow of the FIR filtering result. However, in a case that the chip of the earphone is a fixed-point chip, an overflow of the FIR filtering result should be solved. Therefore, before the step of determining a sum of the number of decimal places indicated by the first data type and the number of decimal places indicated by the second data type, the method may further include: determining whether the chip of the earphone is a fixed-point chip. In a case that the chip of the earphone is a fixed-point chip, the step of determining a sum of the number of decimal places indicated by the first data type and the number of decimal places indicated by the second data type is performed.

With the method for transmitting data through an earphone according to the present disclosure which is applied to an earphone, in order to improve filtering efficiency, the FIR filtering may be performed on the to-be-transmitted data through the earphone in a parallel manner. The number of filtering performed in parallel may be determined according to actual needs. For example, the number of filtering performed in parallel may be 8 or the like.

Figure 3:
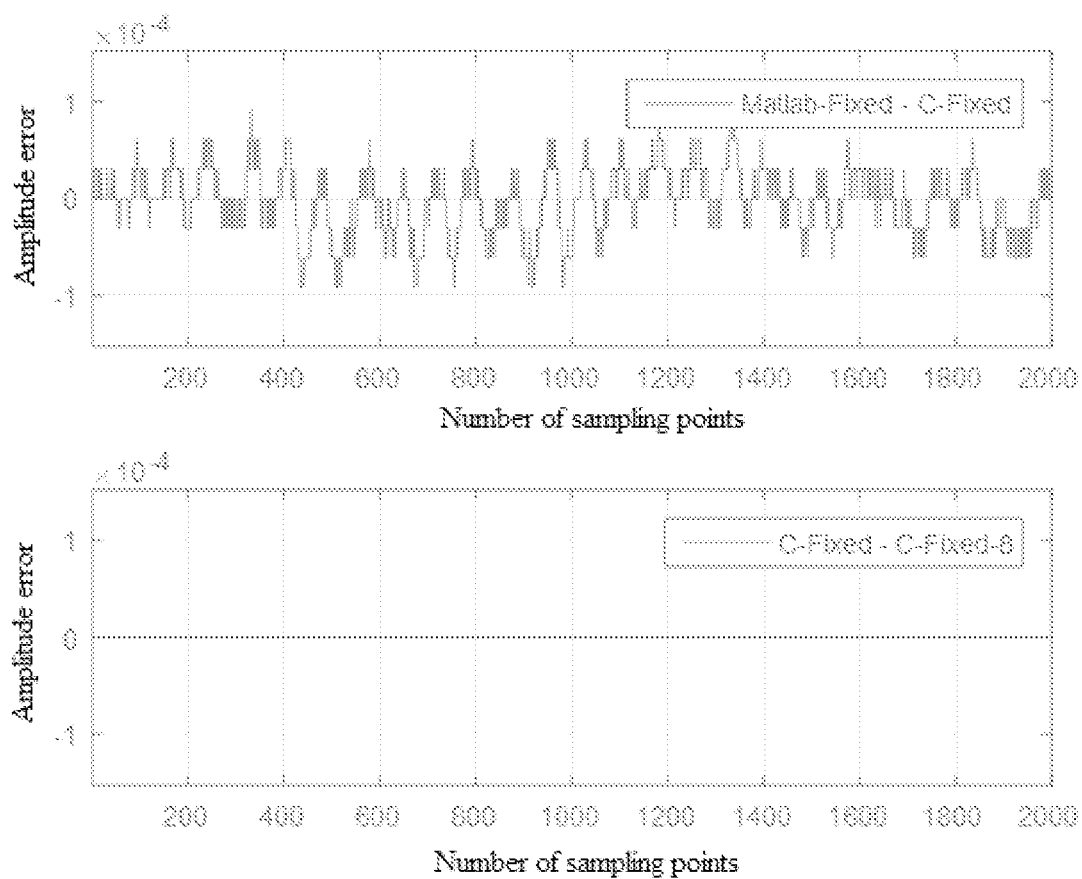
FIG. 3 is a diagram showing an error of the FIR filtering in an experiment.
Figure 4:
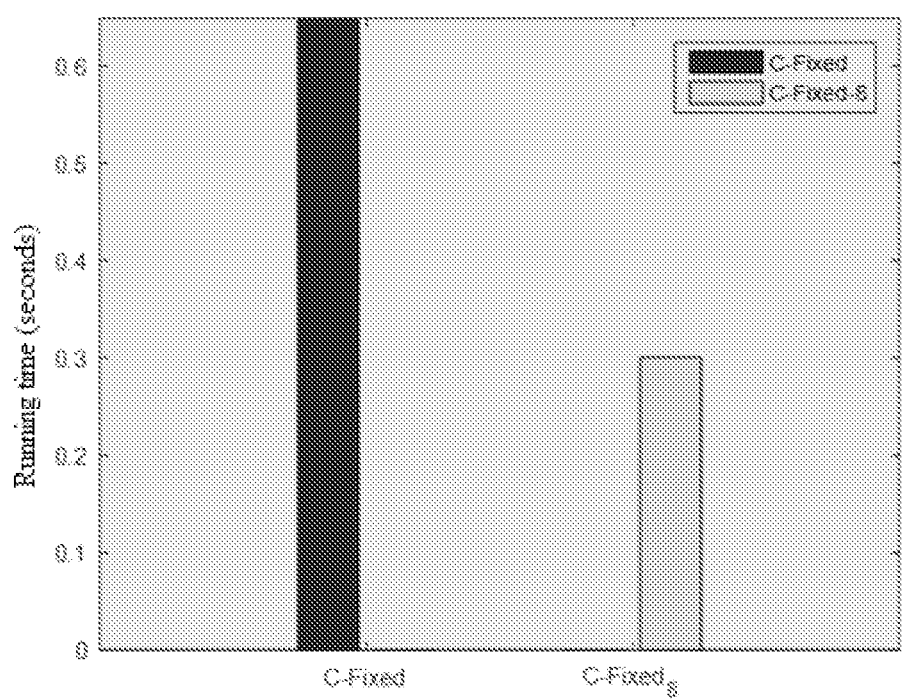
FIG. 4 is a diagram showing a duration of the FIR filtering in an experiment.

For the convenience of explanation, the method for transmitting data through an earphone according to the present disclosure is simulated through experiments. If the FIR filter is a band-pass filter with a passband range of 100 Hz to 1000 Hz and has an order of 383, a frame length is 512. A section of voice data with a duration of 13.405 seconds, a sampling frequency fs of 48 KHz, and a quantization accuracy of 16 bit is taken for performing the experiment. Moreover, if the number of filtering performed in parallel is 8, the result of the experiment is as shown in FIG. 2, FIG. 3 and FIG. 4.

Figure 2:
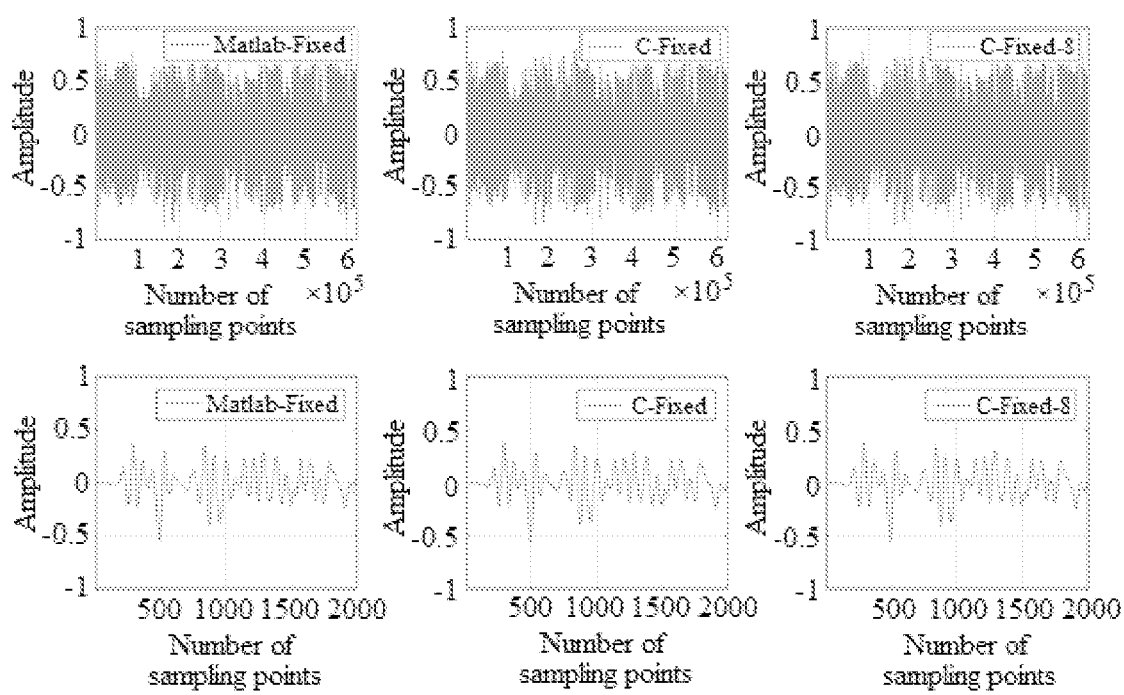
FIG. 2 is a diagram showing an FIR filtering result outputted in an experiment.

In FIG. 2, Matlab-Fixed represents a Matlab fixed-point filtering scheme; C-Fixed represents a fixed-point scheme in which one sample value is calculated each time; and C-Fixed-8 represents the present fixed-point scheme in which 8 points are calculated each time. The first row are graphs showing filtering results obtained through the Matlab scheme or the C fixed-point schemes. The second row are graphs showing filtering results of the first 2000 sample values. As can be seen from FIG. 2, the graphs of filtering results have almost same trends, and there is no sound cracking when tested. As can be seen from FIG. 3, the result of the C fixed-point scheme has an error within ten thousandth compared with result of the Matlab scheme, and the results of the two C fixed-point schemes are completely consistent with each other. As can be seen from FIG. 4, the running time for the scheme of the present disclosure is nearly one-half of that for the original scheme.

Figure 5:
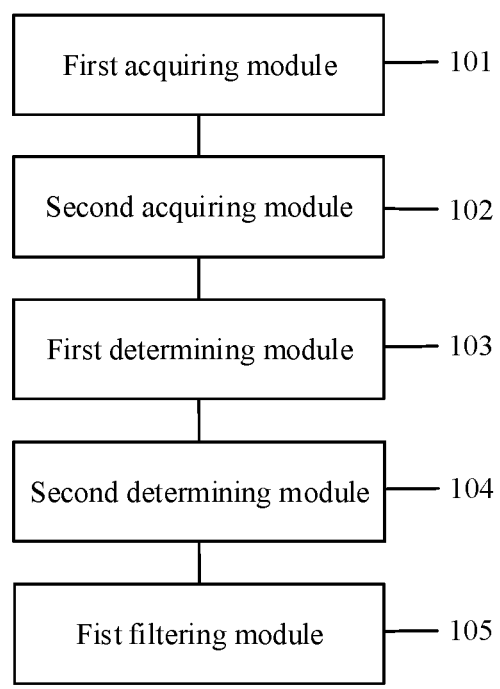
FIG. 5 is a schematic structural diagram of a system for transmitting data through an earphone according to an embodiment of the present disclosure.

Reference is made to FIG. 5, which is a schematic structural diagram of a system for transmitting data through an earphone according to an embodiment of the present disclosure.

The system for transmitting data through an earphone according to the embodiment of the present disclosure is applied to an earphone. The system includes a first acquiring module 101, a second acquiring module 102, a first determining module 103, a second determining module 104, and a first filtering module 105. The first acquiring module 101 is configured to acquire a first data type of to-be-transmitted data. The second acquiring module 102 is configured to acquire a second data type set for an FIR filter coefficient. The first determining module 103 is configured to determine a sum of the number of decimal places indicated by the first data type and the number of decimal places indicated by the second data type. The second determining module 104 is configured to determine, among preset data types, a data type indicating the number of decimal places that is at least two orders more than the sum as a third data type of an FIR filtering result. The first filtering module 105 is configured to perform FIR filtering on the to-be-transmitted data to obtain a target filtering result, and transmit the target filtering result.

The system for transmitting data through an earphone according to an embodiment of the present disclosure is applied to an earphone and may further include a third acquiring module and a first detecting module. The third acquiring module is configured to acquire a fourth data type set for the FIR filtering result, after the first determining module determines a sum of the number of decimal places indicated by the first data type and the number of decimal places indicated by the second data type, and before the second determining module determines, among preset data types, a data type indicating the number of decimal places that is at least two orders more than the sum as a third data type of an FIR filtering result. The first detecting module is configured to determine, among the preset data types, whether the number of decimal places indicated by the fourth data type is at least two orders more than the sum, and instruct, in a case that the number of decimal places indicated by the fourth data type is at least two orders more than the sum, the second determining module to perform a step of determining, among preset data types, a data type indicating the number of decimal places that is at least two orders more than the sum as a third data type of an FIR filtering result.

The system for transmitting data through an earphone according to an embodiment of the present disclosure is applied to an earphone and may further include a second detecting module. The second detecting module is configured to determine whether a chip of the earphone is a fixed-point chip, before the first determining module determines a sum of the number of decimal places indicated by the first data type and the number of decimal places indicated by the second data type; and instruct, in a case that the chip of the earphone is a fixed-point chip, the first determining module to perform a step of determining a sum of the number of decimal places indicated by the first data type and the number of decimal places indicated by the second data type.

The system for transmitting data through an earphone according to an embodiment of the present disclosure is applied to an earphone. The first filtering module may include a first filtering unit configured to perform FIR filtering on the to-be-transmitted data in a parallel manner.

Figure 6:
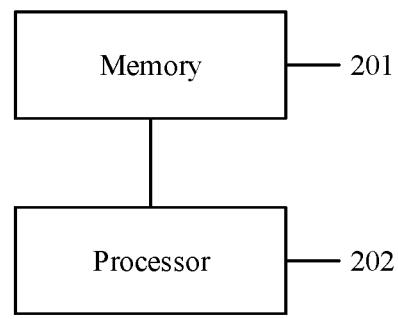
FIG. 6 is a schematic structural diagram of a device for transmitting data through an earphone according to an embodiment of the present disclosure.

A device for transmitting data through an earphone, and a computer readable storage medium are further provided according to the present disclosure, which can realize the same effects as the method for transmitting data through an earphone according to the embodiments of the present disclosure. Reference is made to FIG. 6, which is a schematic structural diagram of a device for transmitting data through an earphone according to an embodiment of the present disclosure.

The device for transmitting data through an earphone according to an embodiment of the present disclosure includes a memory 201 and a processor 202. The memory 201 has a computer program stored thereon. The processor 202 is configured to execute the computer program to perform steps of the method for transmitting data through an earphone as described in any one of the above embodiments.

Figure 7:
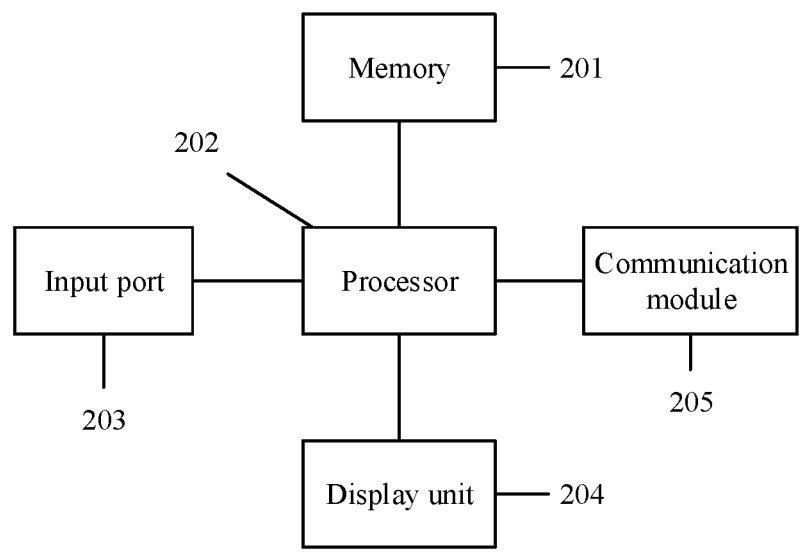
FIG. 7 is a schematic structural diagram of a device for transmitting data through an earphone according to another embodiment of the present disclosure.

Referring to FIG. 7, the device for transmitting data through an earphone according to another embodiment may further includes an input port 203, a display unit 204, and a communication module 205. The input port 203 is connected to the processor 202 and is configured to transmit a command from the outside to the processor 202. The display unit 204 is connected to the processor 202 and is configured to display a processing result of the processor 202 to the outside. The communication module 205 is connected to the processor 202 and is configured to realize communication between the device for transmitting data through an earphone and the outside. The display unit 204 may be a display panel, a laser scanning display, and the like. A communication manner adopted by the communication module 205 includes, but is not limited to, Mobile High-definition Link (HML) technology, Universal Serial bus (USB), High-definition Multimedia Interface (HDMI), Wireless connection, Wireless Fidelity (WiFi) technology, Bluetooth communication technology, low-power Bluetooth communication technology, and the communication technology based on IEEE 802.11s.

A computer readable storage medium is further provided according to an embodiment of the present disclosure. The computer readable storage medium stores a computer program which is executed by a processor to perform steps of the method for transmitting data through an earphone as described in any one of the above embodiments.

The computer readable storage medium in the present disclosure includes a Random Access Memory (RAM), an internal memory, a Read-Only Memory (ROM), an electrically programmable ROM, an electrically erasable programmable ROM, a register, a hard disk, a removable disk drive, a CD-ROM, or any other type of storage medium known in the technical field.

Reference may be made to detailed description of the method for transmitting data through an earphone in the present disclosure for related description of the system for transmitting data through an earphone, the device for transmitting data through an earphone, and the computer readable storage medium according to the present disclosure, which is not repeated herein. Moreover, parts of the foregoing technical solutions provided in the present disclosure that are consistent with the implementation principles of the conventional technical solutions are not described in detail for ease of concise.

It should be further noted that, the relational terms such as first, second or the like are used herein only to distinguish one entity or operation from another, rather than necessitate or imply an actual relationship or order of the entities or operations. Further, the terms "include", "comprise" or any variant thereof is intended to encompass nonexclusive inclusion so that a process, method, article or device including a series of elements includes not only those elements but also other elements which have not been listed definitely or an element(s) inherent to the process, method, article or device. Unless expressively limited otherwise, a process, method, article or device limited by "comprising/including a(n) . . . " does not exclude existence of another identical element in such process, method, article or device.

Based on the above description of the disclosed embodiments, those skilled in the art can implement or use the present disclosure. Various modifications to the embodiments are obvious to the person skilled in the art. General principles defined in the present disclosure may be implemented in other embodiments without departing from the spirit or scope of the present disclosure. Therefore, the present disclosure is not limited to the embodiments described herein, but conforms to the widest scope that complies with the principle and novelty disclosed in this specification.

The invention claimed is:

1. A method for transmitting data through an earphone, wherein the method is applied to the earphone and comprises steps of:
   acquiring a first data type of audio data;
   acquiring a second data type set for an FIR filter coefficient;
   determining a sum of a number of decimal places indicated by the first data type and a number of decimal places indicated by the second data type;
   determining, among preset data types, a data type indicating a number of decimal places that is at least two orders more than the sum as a third data type of an FIR filtering result; and
   performing FIR filtering on the audio data to obtain the FIR filtering result having the third data type, and transmitting the FIR filtering result.

2. The method according to claim 1, wherein after the step of determining a sum of a number of decimal places indicated by the first data type and a number of decimal places indicated by the second data type, and before the step of determining, among preset data types, a data type indicating a number of decimal places that is at least two orders more than the sum as the third data type of the FIR filtering result, the method further comprises:
   acquiring a fourth data type set for the FIR filtering result; and
   determining, among the preset data types, whether a number of decimal places indicated by the fourth data type is at least two orders more than the sum, wherein
   in a case that the number of decimal places indicated by the fourth data type is at least two orders more than the sum, the step of determining, among preset data types, a data type indicating a number of decimal places that is at least two orders more than the sum as the third data type of the FIR filtering result is performed.

3. The method according to claim 1, wherein before the step of determining a sum of a number of decimal places indicated by the first data type and a number of decimal places indicated by the second data type, the method further comprises:
   determining whether a chip of the earphone is a fixed-point chip, wherein
   in a case that the chip of the earphone is a fixed-point chip, the step of determining a sum of a number of decimal places indicated by the first data type and a number of decimal places indicated by the second data type is performed.

4. The method according to claim 1, wherein the step of performing FIR filtering on the audio data comprises:
performing FIR filtering on the audio data in a parallel manner.

5. A device for transmitting data through an earphone, wherein the device is applied to the earphone, and comprises:
a memory configured to store a computer program; and
a processor configured to execute the computer program to perform the method for transmitting data through an earphone according to claim 1.

6. A non-transitory computer readable storage medium, storing a computer program, the computer program, when being executed by a processor, performing steps of the method for transmitting data through an earphone according to claim 1.

7. A system for transmitting data through an earphone, wherein the system is applied to the earphone and comprises:
a first acquiring module configured to acquire a first data type of audio data;
a second acquiring module configured to acquire a second data type set for an FIR filter coefficient;
a first determining module configured to determine a sum of a number of decimal places indicated by the first data type and a number of decimal places indicated by the second data type;
a second determining module configured to determine, among preset data types, a data type indicating a number of decimal places that is at least two orders more than the sum as a third data type of an FIR filtering result; and
a first filtering module configured to perform FIR filtering on the audio data to obtain the FIR filtering result having the third data type, and transmitting the FIR filtering result.

8. The system according to claim 7, further comprising:
a third acquiring module configured to acquire a fourth data type set for the FIR filtering result, after the first determining module determines a sum of a number of decimal places indicated by the first data type and a number of decimal places indicated by the second data type, and before the second determining module determines, among preset data types, a data type indicating a number of decimal places that is at least two orders more than the sum as the third data type of the FIR filtering result; and
a first detecting module configured to determine, among the preset data types, whether a number of decimal places indicated by the fourth data type is at least two orders more than the sum, and instruct, in a case that the number of decimal places indicated by the fourth data type is at least two orders more than the sum, the second determining module to perform a step of determining, among preset data types, a data type indicating a number of decimal places that is at least two orders more than the sum as the third data type of the FIR filtering result.

9. The system according to claim 7, further comprising:
a second detecting module configured to determine whether a chip of the earphone is a fixed-point chip, before the first determining module determines a sum of a number of decimal places indicated by the first data type and a number of decimal places indicated by the second data type, and instruct, in a case that the chip of the earphone is a fixed-point chip, the first determining module to perform a step of determining a sum of a number of decimal places indicated by the first data type and a number of decimal places indicated by the second data type.

10. The system according to claim 7, wherein the first filtering module comprises:
a first filtering unit configured to perform FIR filtering on the audio data in a parallel manner.

* * * * *